US011966246B2

(12) United States Patent
Chiang et al.

(10) Patent No.: US 11,966,246 B2
(45) Date of Patent: Apr. 23, 2024

(54) ELECTRONIC CIRCUIT FOR GENERATING REFERENCE CURRENT WITH LOW TEMPERATURE COEFFICIENT

(71) Applicant: Richtek Technology Corporation, Zhubei (TW)

(72) Inventors: Chia-Tseng Chiang, New Taipei (TW); Hao-Yu Li, New Taipei (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 246 days.

(21) Appl. No.: 17/683,462

(22) Filed: Mar. 1, 2022

(65) Prior Publication Data

US 2023/0072042 A1 Mar. 9, 2023

Related U.S. Application Data

(60) Provisional application No. 63/241,113, filed on Sep. 7, 2021.

(30) Foreign Application Priority Data

Oct. 21, 2021 (TW) ................................ 110139015

(51) Int. Cl.
*G05F 3/26* (2006.01)

(52) U.S. Cl.
CPC ................................... *G05F 3/262* (2013.01)

(58) Field of Classification Search
CPC ...................................................... G05F 3/262
See application file for complete search history.

(56) References Cited

U.S. PATENT DOCUMENTS 10,503,185 B1 * 12/2019 Mathad .................... G05F 1/59
2007/0200616 A1 * 8/2007 Shin .......................... G05F 3/30 327/539
2015/0185754 A1 * 7/2015 Liu ......................... G05F 3/267 323/313
2019/0115885 A1 * 4/2019 Prasad ................ H03F 3/45089
2021/0405677 A1 * 12/2021 Panja ...................... G05F 3/267
2022/0317718 A1 * 10/2022 Gendai ................... G05F 3/242

FOREIGN PATENT DOCUMENTS

CN 105739596 A * 7/2016 ............ G05F 3/262
CN 113885639 A * 1/2022
CN 114489213 A * 5/2022

* cited by examiner

*Primary Examiner* — Sisay G Tiku
(74) *Attorney, Agent, or Firm* — McClure, Qualey & Rodack, LLP

(57) ABSTRACT

An electronic circuit includes a first transistor coupled between a first node and a supply voltage and controlled by a first node, a second transistor coupled between a second node and the supply voltage and controlled by the first node, a third transistor coupled between a third node and the supply voltage and controlled by a fourth node, a fourth transistor coupled between the fourth node and the supply voltage and controlled by the fourth node, a fifth transistor coupled between the first node and the fifth node and controlled by a reference voltage, a sixth transistor coupled between the second node and a ground and controlled by the third node, a seventh transistor coupled between the fourth node and the ground and controlled by the second node, a first resistor coupled the fourth node to the ground, and a second resistor coupled to the fifth node.

20 Claims, 7 Drawing Sheets

300

ELECTRONIC CIRCUIT FOR GENERATING REFERENCE CURRENT WITH LOW TEMPERATURE COEFFICIENT

CROSS REFERENCE TO RELATED APPLICATIONS

This application claims the benefit of U.S. Provisional Application No. 63/241,113, filed on Sep. 7, 2021, the entirety of which is incorporated by reference herein.

This Application claims priority of Taiwan Patent Application No. 110139015, filed on Oct. 21, 2021, the entirety of which is incorporated by reference herein.

BACKGROUND OF THE INVENTION

Field of the Invention

The disclosure is generally related to an electronic circuit, and more particularly it is related to an electronic circuit for generating a reference current with a low temperature coefficient.

Description of the Related Art

Nowadays, many applications are used in automotive and medical electronic products, and therefore a current reference circuit with high accuracy and a low temperature coefficient is very important. FIG. 1 is a circuit diagram of an electronic circuit in accordance with the prior art. As shown in FIG. 1, the electronic circuit 100 includes an operational amplifier 110, a first N-type transistor N1, a first P-type transistor P1, a second P-type transistor P2, a third P-type transistor P3, and a reference resistor RF.

The operational amplifier 110 is configured to compare the bandgap voltage VBG with a low temperature coefficient with the resistance voltage VR to control the first N-type transistor N1 to increase or decrease the first current I1. The first P-type transistor P1, the second P-type transistor P2 and the third P-type transistor P3 form a current mirror for mirroring the first current I1 to generate a second current I2 and a reference current IREF. When the resistor voltage VR is equal to the bandgap voltage VBG and the reference resistor RF has a temperature coefficient of zero, the temperature coefficient of the reference current IREF is determined by the temperature coefficient of the bandgap voltage VBG.

However, the operational amplifier 110 takes up a large amount of the circuit area and consumes a lot of current. The generation of a reference current with high accuracy and a low temperature coefficient by an operational amplifier is expensive. In order to reduce the cost of generating a reference current with a low temperature coefficient, it is necessary to optimize the electronic circuit for generating a reference current with a low temperature coefficient.

BRIEF SUMMARY OF THE INVENTION

The invention provides an electronic circuit for generating a reference current with high accuracy and a low temperature coefficient. Since the electronic circuit provided herein does not require an operational amplifier, the required circuit area and power consumption can be greatly reduced, and the electronic circuit provided herein can operate by itself without a current source. In addition, the electronic circuit provided herein makes the temperature coefficient of the reference current determined by the reference voltage through the matching of the transistors and the elimination of the temperature coefficient of the resistors. Furthermore, the electronic circuit provided herein may operate at a lower supply voltage, and may also convert the bandgap voltage to other voltage values by properly selecting the resistance values.

In an embodiment, an electronic circuit comprises a first transistor, a second transistor, a third transistor, a fourth transistor, a fifth transistor, a sixth transistor, a seventh transistor, a first resistor, and a second resistor. The first transistor comprises a drain terminal, a source terminal, and a gate terminal, in which the drain terminal is coupled to a first node, the source terminal is coupled to a supply voltage, and the gate terminal is coupled to the first node. The second transistor comprises a drain terminal, a source terminal, and a gate terminal, in which the drain terminal is coupled to a second node, the source terminal is coupled to the supply voltage, and the gate terminal is coupled to the first node. The third transistor comprises a drain terminal, a source terminal, and a gate terminal, in which the drain terminal is coupled to a third node, the source terminal is coupled to the supply voltage, and the gate terminal is coupled to a fourth node. The fourth transistor comprises a drain terminal, a source terminal, and a gate terminal, in which the drain terminal is coupled to the fourth node, the source terminal is coupled to the supply voltage, and the gate terminal is coupled to the fourth node. The fifth transistor comprises a drain terminal, a source terminal, and a gate terminal, in which the drain terminal is coupled to the first node, the source terminal is coupled to a fifth node, and the gate terminal receives a reference voltage. The sixth transistor comprises a drain terminal, a source terminal, and a gate terminal, in which the drain terminal is coupled to the second node, the source terminal is coupled to a ground, and the gate terminal is coupled to the third node. The seventh transistor comprises a drain terminal, a source terminal, and a gate terminal, in which the drain terminal is coupled to the fourth node, the source terminal is coupled to the ground, and the gate terminal is coupled to the second node. The first resistor is coupled between the fifth node and the ground. The second resistor is coupled between the third node and the ground.

According to an embodiment of the invention, the electronic circuit further comprises an eighth transistor and a ninth transistor. The eighth transistor comprises a drain terminal, a source terminal, and a gate terminal, in which the drain terminal is coupled to a reference node, the source terminal is coupled to the supply voltage, and the gate terminal is coupled to the first node. The ninth transistor comprises a drain terminal, a source terminal, and a gate terminal, in which the drain terminal is coupled to the reference node, the source terminal is coupled to the supply voltage, and the gate terminal is coupled to the fourth node.

According to an embodiment of the invention, the first transistor, the second transistor, the third transistor, the fourth transistor, the eighth transistor, and the ninth transistor are P-type transistors, and the fifth transistor, the sixth transistor, and the seventh transistor are N-type transistors.

According to an embodiment of the invention, the electronic circuit further comprises a third resistor. The third resistor is coupled between the reference node and the ground. An output voltage is generated at the reference node. A temperature coefficient of the output voltage is determined by the reference voltage.

According to an embodiment of the invention, the eighth transistor and the ninth transistor generate a reference current at the reference node. A temperature coefficient of the reference current is determined by a temperature coefficient of the reference voltage. The first transistor, the second transistor, and the eighth transistor are arranged in a common-centroid manner, and the third transistor, the fourth transistor, and the ninth transistor are arranged in the common-centroid manner.

According to an embodiment of the invention, a base terminal of the fifth transistor is coupled to the fifth node, and a base terminal of the sixth transistor is coupled to the ground. The fifth transistor is deposited in a first P-type well coupled to the fifth node, and the sixth transistor is deposited in a second P-type well coupled to the ground. The first P-type well and the second P-type well are arranged in a common-centroid manner.

According to an embodiment of the invention, the first resistor comprises a first sub-resistor and a second sub-resistor. The first sub-resistor has a first positive temperature coefficient. The second sub-resistor has a first negative temperature coefficient. The first sub-resistor and the second sub-resistor are connected in series to form the first resistor.

According to an embodiment of the invention, a ratio of a resistance value of the first sub-resistor to a resistance value of the second sub-resistor is a first resistance ratio, and a ratio of the first positive temperature coefficient to the first negative temperature coefficient is a first temperature-coefficient ratio. The first resistance ratio is a reciprocal of the first temperature-coefficient ratio for reducing a temperature coefficient of the first resistor.

According to an embodiment of the invention, the second resistor comprises a third sub-resistor and a fourth sub-resistor. The third sub-resistor has a second positive temperature coefficient. The fourth sub-resistor has a second negative temperature coefficient. The third sub-resistor and the fourth sub-resistor are connected in series to form the second resistor.

According to an embodiment of the invention, a ratio of a resistance value of the third sub-resistor to a resistance value of the fourth sub-resistor is a second resistance ratio, and a ratio of the second positive temperature coefficient to the second negative temperature coefficient is a second temperature-coefficient ratio. The second resistance ratio is a reciprocal of the second temperature-coefficient ratio for reducing a temperature coefficient of the second resistor.

In another embodiment, an electronic circuit comprises a first transistor, a second transistor, a third transistor, a fourth transistor, a fifth transistor, a sixth transistor, a seventh transistor, a first resistor, and a second resistor. The first transistor comprises a drain terminal, a source terminal, and a gate terminal, in which the drain terminal is coupled to a first node, the source terminal is coupled to a ground, and the gate terminal is coupled to the first node. The second transistor comprises a drain terminal, a source terminal, and a gate terminal, in which the drain terminal is coupled to a second node, the source terminal is coupled to the ground, and the gate terminal is coupled to the first node. The third transistor comprises a drain terminal, a source terminal, and a gate terminal, in which the drain terminal is coupled to a third node, the source terminal is coupled to the ground, and the gate terminal is coupled to a fourth node. The fourth transistor comprises a drain terminal, a source terminal, and a gate terminal, in which the drain terminal is coupled to the fourth node, the source terminal is coupled to the ground, and the gate terminal is coupled to the fourth node. The fifth transistor comprises a drain terminal, a source terminal, and a gate terminal, in which the drain terminal is coupled to the first node, the source terminal is coupled to a fifth node, and the gate terminal receives a reference voltage. The sixth transistor comprises a drain terminal, a source terminal, and a gate terminal, in which the drain terminal is coupled to the second node, the source terminal is coupled to a supply voltage, and the gate terminal is coupled to the third node. The seventh transistor comprises a drain terminal, a source terminal, and a gate terminal, in which the drain terminal is coupled to the fourth node, the source terminal is coupled to the supply voltage, and the gate terminal is coupled to the second node. The first resistor is coupled between the fifth node and the supply voltage. The second resistor is coupled between the third node and the supply voltage.

According to an embodiment of the invention, the electronic circuit further comprises an eighth transistor and a ninth transistor. The eighth transistor comprises a drain terminal, a source terminal, and a gate terminal, in which the drain terminal is coupled to a reference node, the source terminal is coupled to the ground, and the gate terminal is coupled to the first node. The ninth transistor comprises a drain terminal, a source terminal, and a gate terminal, in which the drain terminal is coupled to the reference node, the source terminal is coupled to the ground, and the gate terminal is coupled to the fourth node.

According to an embodiment of the invention, the first transistor, the second transistor, the third transistor, the fourth transistor, the eighth transistor, and the ninth transistor are N-type transistors, and the fifth transistor, the sixth transistor, and the seventh transistor are P-type transistors.

According to an embodiment of the invention, the electronic circuit further comprises a third resistor. The third resistor is coupled between the reference node and the supply voltage. An output voltage is generated at the reference node, wherein a temperature coefficient of the output voltage is determined by the reference voltage.

According to an embodiment of the invention, the eighth transistor and the ninth transistor generate a reference current at the reference node. A temperature coefficient of the reference current is determined by a temperature coefficient of the reference voltage. The first transistor, the second transistor, and the eighth transistor are arranged in a common-centroid manner, and the third transistor, the fourth transistor, and the ninth transistor are arranged in the common-centroid manner.

According to an embodiment of the invention, a base terminal of the fifth transistor is coupled to the fifth node, and a base terminal of the sixth transistor is coupled to the supply voltage. The fifth transistor is deposited in a first N-type well coupled to the fifth node, and the sixth transistor is deposited in a second N-type well coupled to the supply voltage. The first N-type well and the second N-type well are arranged in a common-centroid manner.

According to an embodiment of the invention, the first resistor comprises a first sub-resistor and a second sub-resistor. The first sub-resistor has a first positive temperature coefficient. The second sub-resistor has a first negative temperature coefficient. The first sub-resistor and the second sub-resistor are connected in series to form the first resistor.

According to an embodiment of the invention, a ratio of a resistance value of the first sub-resistor to a resistance value of the second sub-resistor is a first resistance ratio, and a ratio of the first positive temperature coefficient to the first negative temperature coefficient is a first temperature-coefficient ratio. The first resistance ratio is a reciprocal of the first temperature-coefficient ratio for reducing a temperature coefficient of the first resistor.

According to an embodiment of the invention, the second resistor comprises a third sub-resistor and a fourth sub-resistor. The third sub-resistor has a second positive temperature coefficient. The fourth sub-resistor has a second negative temperature coefficient. The third sub-resistor and the fourth sub-resistor are connected in series to form the second resistor.

According to an embodiment of the invention, a ratio of a resistance value of the third sub-resistor to a resistance value of the fourth sub-resistor is a second resistance ratio, and a ratio of the second positive temperature coefficient to the second negative temperature coefficient is a second temperature-coefficient ratio. The second resistance ratio is a reciprocal of the second temperature-coefficient ratio for reducing a temperature coefficient of the second resistor.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
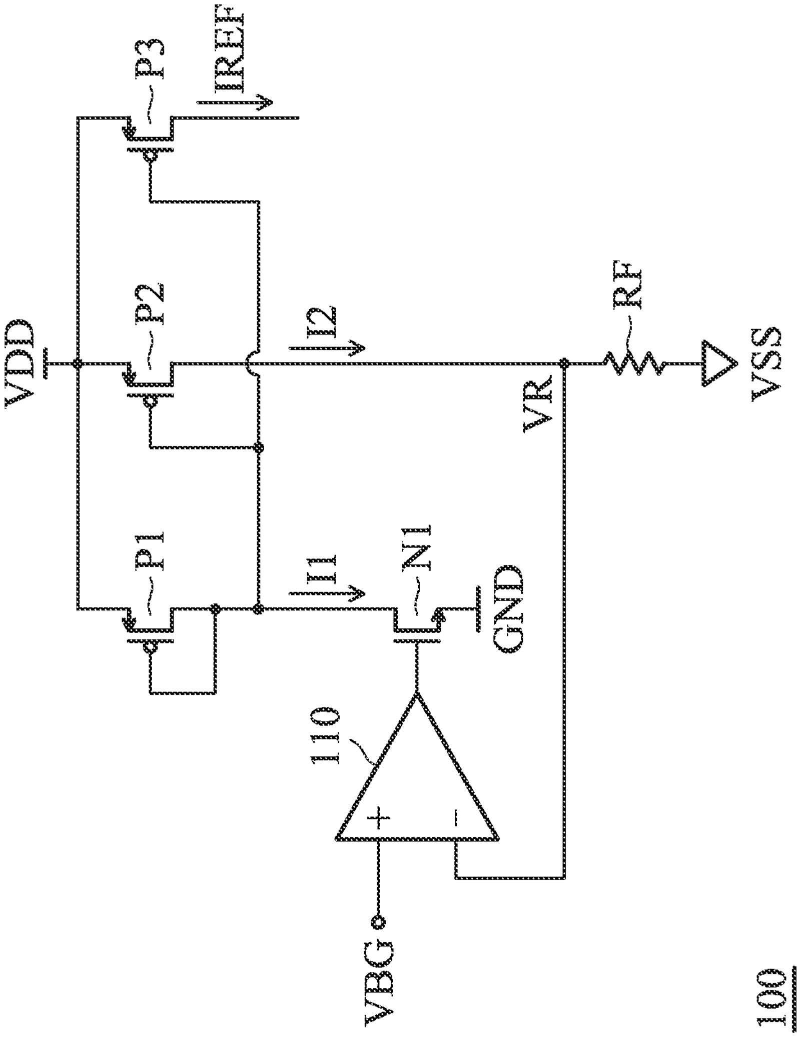
FIG. 1 is a circuit diagram of an electronic circuit in accordance with the prior art.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It would be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It is understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

Figure 2:
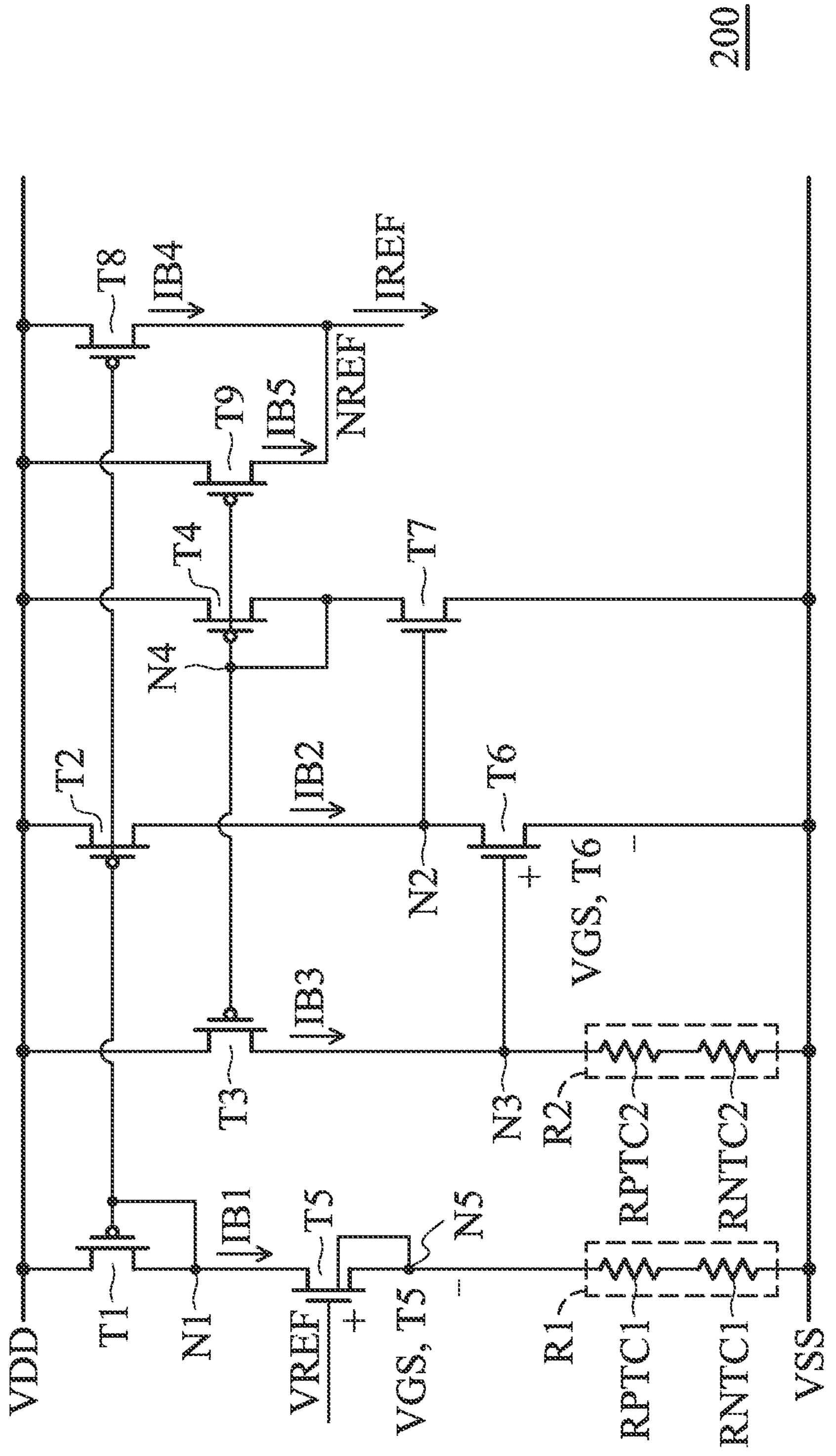
FIG. 2 is a circuit diagram of an electronic circuit in accordance with an embodiment of the invention.

FIG. 2 is a circuit diagram of an electronic circuit in accordance with an embodiment of the invention. As shown in FIG. 2, the electronic circuit 200 includes a first transistor T1, a second transistor T2, a third transistor T3, a fourth transistor T4, a fifth transistor T5, a sixth transistor T6, a seventh transistor T7, a first resistor R1 and a second resistor R2.

The first transistor T1 includes a drain terminal, a source terminal and a gate terminal, in which the drain terminal is coupled to the first node N1, the source terminal is coupled to the supply voltage VDD, and the gate terminal is coupled to the first node N1. In other words, the first transistor T1 is connected in the form of a diode. The second transistor T2 includes a drain terminal, a source terminal and a gate terminal, in which the drain terminal is coupled to the second node N2, the source terminal is coupled to the supply voltage VDD, and the gate terminal is coupled to the first node N1.

The third transistor T3 includes a drain terminal, a source terminal and a gate terminal, in which the drain terminal is coupled to the third node N3, the source terminal is coupled to the supply voltage VDD, and the gate terminal is coupled to the fourth node N4. The fourth transistor T4 includes a drain terminal, a source terminal and a gate terminal, in which the drain terminal is coupled to the fourth node N4, the source terminal is coupled to the supply voltage VDD, and the gate terminal is coupled to the fourth node N4. In other words, the fourth transistor T4 is connected in the form of a diode.

The fifth transistor T5 includes a drain terminal, a source terminal and a gate terminal, in which the drain terminal is coupled to the first node N1, the source terminal is coupled to the fifth node N5, and the gate terminal receives the reference voltage VREF. According to an embodiment of the invention, the reference voltage VREF is a bandgap reference voltage generated by a bandgap circuit, in which the bandgap voltage has a low temperature coefficient.

The sixth transistor T6 includes a drain terminal, a source terminal and a gate terminal, wherein the drain terminal is coupled to the second node N2, the source terminal is coupled to the ground terminal VSS, and the gate terminal is coupled to the third node N3. The seventh transistor T7 includes a drain terminal, a source terminal and a gate terminal, in which the drain terminal is coupled to the fourth node N4, the source terminal is coupled to the ground terminal VSS, and the gate terminal is coupled to the second node N2. The first resistor R1 is coupled between the fifth node N5 and the ground terminal VSS, and the second resistor R2 is coupled between the third node N3 and the ground terminal VSS.

As shown in FIG. 2, the electronic circuit 200 further includes an eighth transistor T8 and a ninth transistor T9. The eighth transistor T8 includes a drain terminal, a source terminal and a gate terminal, in which the drain terminal is coupled to the reference node NREF, the source terminal is coupled to the supply voltage VDD, and the gate terminal is coupled to the first node N1. The ninth transistor T9 includes a drain terminal, a source terminal and a gate terminal, in which the drain terminal is coupled to the reference node NREF, the source terminal is coupled to the supply voltage VDD, and the gate terminal is coupled to the fourth node N4.

According to an embodiment of the present invention, the first transistor T1, the second transistor T2, the third transistor T3, the fourth transistor T4, the eighth transistor T8, and the ninth transistor T9 are all P-type transistors, and the fifth transistor T5, the sixth transistor T6, and the seventh transistor T7 are all N-type transistors. According to an embodiment of the invention, the first transistor T1, the second transistor T2, and the eighth transistor T8 form a current mirror, and the third transistor T3, the fourth transistor T4, and the ninth transistor T9 form a current mirror.

According to some embodiments of the invention, the length-to-width ratio of the second transistor T2 can be N times that of the first transistor T1, and the length-to-width ratio of the eighth transistor T8 can be M times that of the first transistor T1. Therefore, the second bias current IB2 is N times the first bias current IB1, and the fourth bias current IB4 is M times the first bias current IB1. According to some embodiments of the invention, the length-to-width ratio of the ninth transistor T9 may be P times that of the third transistor T3, so the fifth bias current IB5 is P times the third bias current IB3.

In order to simplify the description below, it is explained that the first transistor T1, the second transistor T2, the third transistor T3, the fourth transistor T4, the eighth transistor T8 and the ninth transistor T9 both have the same length-to-width ratio, and that the fifth transistor T5 and the sixth transistor T6 have the same length-to-width ratio, but they are not intended to be limited thereto. In other words, it will be explained with the assumption that the first bias current IB1 is equal to the second bias current IB2 and the fourth bias current IB4, and that the third bias current IB3 is equal to the fifth bias current IB5.

According to an embodiment of the invention, when the fifth transistor T5 is turned on according to the reference voltage VREF, the fifth transistor T5 generates the first bias current IB1. The first bias current IB1 is expressed as Eq. 1, in which the fifth gate-to-source voltage VGS,T5 of the fifth transistor T5 is:

$$IB1 = \frac{VREF - VGS, T5}{R1} \quad \text{(Eq. 1)}$$

According to an embodiment of the invention, when the length-to-width ratio of the first transistor T1 and that of the second transistor T2 are the same, the second bias current IB2 flowing through the sixth transistor T6 is equal to the first bias voltage current IB1. The second bias current IB2 flows through the sixth transistor T6 to generate a sixth gate-source voltage VGS,T6, and a third bias current IB3 is generated at the third node N3, in which the third bias current IB3 is expressed as Eq. 2:

$$IB3 = \frac{VGS, T6}{R2} \quad \text{(Eq. 2)}$$

According to an embodiment of the invention, when the first bias current IB1 is equal to the second bias current IB2 and the fourth bias current IB4 and the third bias current IB3 is equal to the fifth bias current IB5, the reference current IREF generated by node NREF is expressed as Eq. 3:

$$IREF = IB4 + IB5 = \frac{VREF - VGS, T5}{R1} + \frac{VGS, T6}{R2} \quad \text{(Eq. 3)}$$

According to an embodiment of the invention, when the length-to-width ratio and the threshold voltage of the fifth transistor T5 match to those of the sixth transistor T6 and the resistance value of the first resistor R1 and the resistance value of the second resistor R2 are both equal to the resistance value R, the reference current IREF can be simplified as expressed in Eq. 4:

$$IREF = \frac{VREF}{R} \quad \text{(Eq. 4)}$$

According to an embodiment of the invention, in order to make the fifth gate-to-source voltage VGS,T5 equal to the sixth gate-to-source voltage VGS,T6, the base terminal of the fifth transistor T5 is coupled to the fifth node N5 so that the fifth transistor T5 and the sixth transistor T6 have the identical threshold voltage. In addition, in order to match the length-to-width ratio of the fifth transistor T5 to that of the sixth transistor T6, the placement of the fifth transistor T5 and the sixth transistor T6 needs to be carefully considered as well, which will be described in detail below.

According to an embodiment of the invention, when the resistance value R has a temperature coefficient of zero, this means that the resistance value R does not change with temperature, the temperature coefficient of the reference current IREF is determined by the temperature coefficient of the reference voltage VREF. According to an embodiment of the invention, the reference voltage VREF is a bandgap reference voltage generated by a bandgap circuit, so the reference voltage VREF has a very low temperature coefficient. In addition, the resistance value R has a temperature coefficient of zero, and therefore the temperature coefficient of the reference current IREF is determined by the temperature coefficient of the reference voltage VREF.

As shown in FIG. 2, the first resistor R1 further includes a first positive temperature coefficient resistor RPTC1 and a first negative temperature coefficient resistor RNTC1. The first positive temperature coefficient resistor RPTC1 has a first positive temperature coefficient, and the first negative temperature coefficient resistor RNTC1 has a first negative temperature coefficient, in which the first positive temperature coefficient resistor RPTC1 and the first negative temperature coefficient resistor RNTC1 are connected in series to form the first resistor R1.

According to an embodiment of the invention, the resistance value of the first positive temperature coefficient resistor RPTC1 increases as the temperature rises, and the resistance value of the first negative temperature coefficient resistor RNTC1 decreases as the temperature rises. According to an embodiment of the invention, the ratio of the resistance value of the first positive temperature coefficient resistor RPTC1 to the resistance value of the first negative temperature coefficient resistor RNTC1 is the reciprocal of the ratio of the first positive temperature coefficient to the first negative temperature coefficient, such that the temperature coefficient of the first resistor R1 is reduced to zero.

Similarly, the second resistor R2 further includes a second positive temperature coefficient resistor RPTC2 and a second negative temperature coefficient resistor RNTC2. The second positive temperature coefficient resistor RPTC2 has a second positive temperature coefficient, and the second negative temperature coefficient resistor RNTC2 has a second negative temperature coefficient, in which the second positive temperature coefficient resistor RPTC2 and the second negative temperature coefficient resistor RNTC2 are connected in series to form the first resistors R2.

According to an embodiment of the present invention, the resistance value of the second positive temperature coefficient resistor RPTC2 increases as the temperature increases, and the resistance value of the second negative temperature coefficient resistor RNTC2 decreases as the temperature increases. According to an embodiment of the invention, the ratio of the resistance value of the second positive temperature coefficient resistor RPTC2 to the resistance value of the second negative temperature coefficient resistor RNTC2 is the reciprocal of the ratio of the second positive temperature coefficient to the second negative temperature coefficient, so that the temperature coefficient of the second resistor R2 is reduced to zero.

As shown in FIG. 2, the seventh transistor T7 is configured to stabilize the third bias current IB3. According to an embodiment of the invention, when the third bias current IB3 increases, the sixth gate-source voltage VGS,T6 increases to decrease the voltage of the second node N2 and to lower the conduction level of the seventh transistor T7 so as to increase the voltage of the fourth node N4. The third transistor T3 lowers the third bias current IB3 in response to the increased voltage of the fourth node N4.

According to another embodiment of the invention, when the third bias current IB3 decreases, the sixth gate-source voltage VGS,T6 decreases to increase the voltage of the second node N2, and to rise the conduction level of the seventh transistor T7 to reduce the voltage of the fourth node N4. The third transistor T3 increases the third bias current IB3 in response to the lowered voltage of the fourth node N4. In other words, through the negative feedback path formed by the third transistor T3, the fourth transistor T4, and the seventh transistor T7, the voltage of the third node N3 and the third bias current IB3 can be effectively stabilized.

Figure 3:
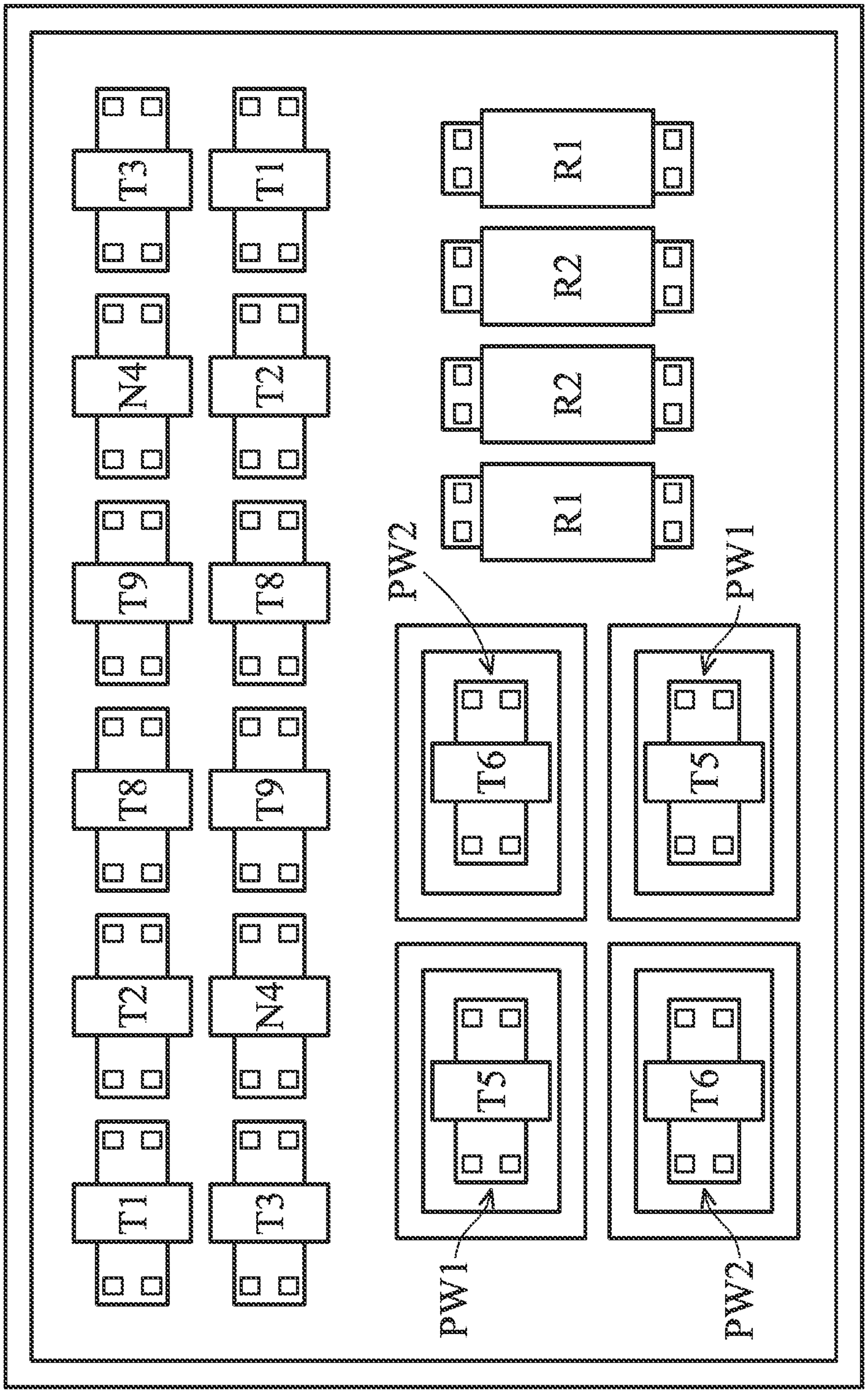
FIG. 3 is a top view showing the layout of the electronic circuit in FIG. 2 of the invention.

FIG. 3 is a top view showing the layout of the electronic circuit in FIG. 2 of the invention. The following description of the layout diagram 300 will be combined with the electronic circuit 200 of FIG. 2 for the convenience of detailed description.

According to some embodiments of the invention, since the first transistor T1, the second transistor T2, and the eighth transistor T8 form a current mirror, the first transistor T1, the second transistor T2, and the eighth transistor T8 must be matched to one another for maintaining the ratio among the first bias current IB1, the second bias current IB2, and the fourth bias current IB4. In addition, the third transistor T3, the fourth transistor T4, and the ninth transistor T9 must be matched to one another for maintaining the ratio between the third bias current IB3 and the fifth bias current IB5. Furthermore, the fifth transistor T5 and the sixth transistor T6 must be matched to each other, and the ratio of the length-to-width ratio of the fifth transistor T5 to that of the sixth transistor T6 is equal to the ratio of the length-to-width ratio of the first transistor T1 to that of the second transistor T2.

As shown in FIG. 3, in order to maintain mutual matching among the first transistor T1, the second transistor T2, and the eighth transistor T8 in case of process variation, the first transistor T1, the second transistor T2, and the eighth transistor T8 are arranged in a common-centroid manner. Similarly, the third transistor T3, the fourth transistor T4, and the ninth transistor T9 are also arranged in a common-centroid manner.

As shown in the embodiment of FIG. 3, since the first transistor T1, the second transistor T2, the third transistor T3, the fourth transistor T4, the eighth transistor T8, and the ninth transistor T9 are illustrated to have the identical length-to-width ratio, so that the first transistor T1, the second transistor T2, the third transistor T3, the fourth transistor T4, the eighth transistor T8, and the ninth transistor T9 are arranged together.

According to an embodiment of the invention, in order for the fifth gate-source voltage VGS,T5 of the fifth transistor T5 and the sixth gate-source voltage VGS,T6 of the sixth transistor T6 being cancelled out in Eq. 4 to reduce the temperature coefficient of the reference current IREF, the length-to-width ratio and the threshold voltage of the fifth transistor T5 and those of the sixth transistor T6 must be matched each other. As shown in FIG. 2, the base terminal of the fifth transistor T5 is coupled to the fifth node N5 to reduce the body effect of the fifth transistor T5, so that the threshold voltage of the fifth transistor T5 is substantially the same as the threshold voltage of the sixth transistor T6. In addition, since the fifth transistor T5 is an N-type transistor, the fifth transistor T5 in FIG. 3 is formed in the first P-type well PW1.

In order to match the length-to-width ratio of the fifth transistor T5 to that of the sixth transistor T6, the sixth transistor T6 is also formed in the second P-type well PW2, and the first P-type well PW1 and the second P-type well PW2 are arranged in a common-centroid manner, so that the length-to-width ratio and the threshold voltage of the fifth transistor T5 and those of the sixth transistor T6 are still matched to each other under the condition of process variation. According to an embodiment of the invention, the first P-type well PW1 is coupled to the fifth node N5, and the second P-type well PW2 is coupled to the ground terminal VSS.

According to an embodiment of the invention, since the resistance value of the first resistor R1 and the resistance value of the second resistor R2 have the same resistance value R in Eq. 4, the first resistor R1 and the second resistor R2 in FIG. 3 are also arranged in a common-centroid manner, so that the resistance value of the first resistor R1 and the resistance value of the second resistor R2 remain substantially the same under the condition of process variation.

Figure 4:
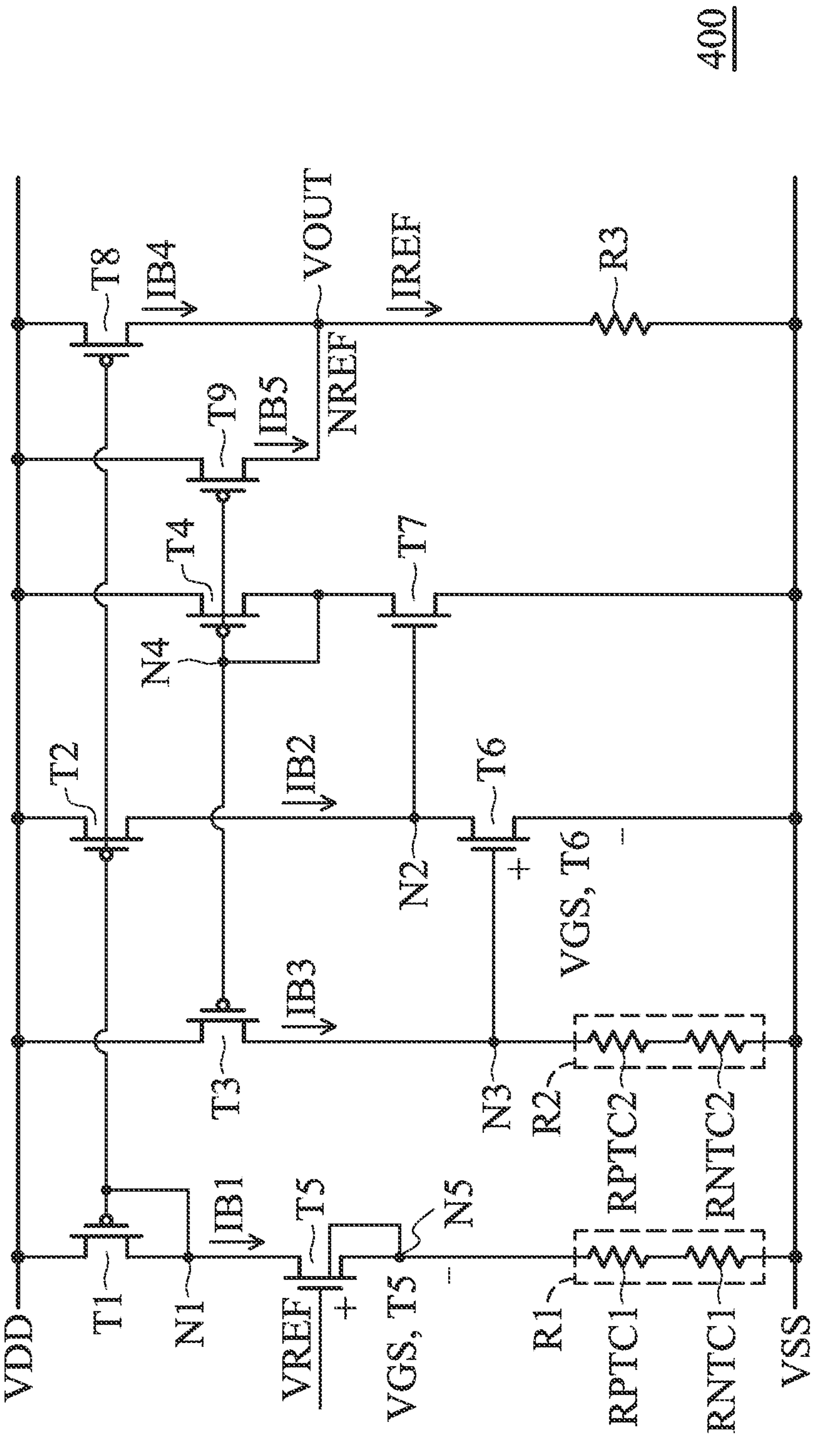
FIG. 4 is a circuit diagram of an electronic circuit in accordance with another embodiment of the invention.

FIG. 4 is a circuit diagram of an electronic circuit in accordance with another embodiment of the invention. As shown in FIG. 4, when the electronic circuit 400 is compared with the electronic circuit 200 in FIG. 2, the electronic circuit 400 further includes a third resistor R3, in which the third resistor R3 is coupled between the reference node NREF and the ground terminal VSS. According to other embodiments of the invention, the temperature coefficient of the third resistor R3 is reduced to zero by the way of connecting a resistor with the positive temperature coefficient and a resistor with the negative temperature coefficient in series as the first resistor R1 and the second resistor R2 do, which will not be repeated herein.

According to some embodiments of the invention, the electronic circuit 400 may generate the output voltage VOUT at the reference node NREF with a selection of the third resistor R3, in which the temperature coefficient of the output voltage VOUT is determined by the temperature coefficient of the reference voltage VREF, and the voltage of the output voltage VOUT should be less than the supply voltage VDD minus the source-to-drain voltage of the eighth transistor T8 or the ninth transistor T9. In other words, when the reference voltage VREF is the bandgap voltage generated by the bandgap circuit, the electronic circuit 400 is able to convert the reference voltage VREF into any voltage value of the output voltage VOUT with the third resistor R3 having a low temperature coefficient under the condition of maintaining the eighth transistor T8 and the ninth transistor T9 both in the saturation region, in which the temperature coefficient of the output voltage VOUT is determined by the temperature coefficient of the reference voltage VREF.

Figure 5:
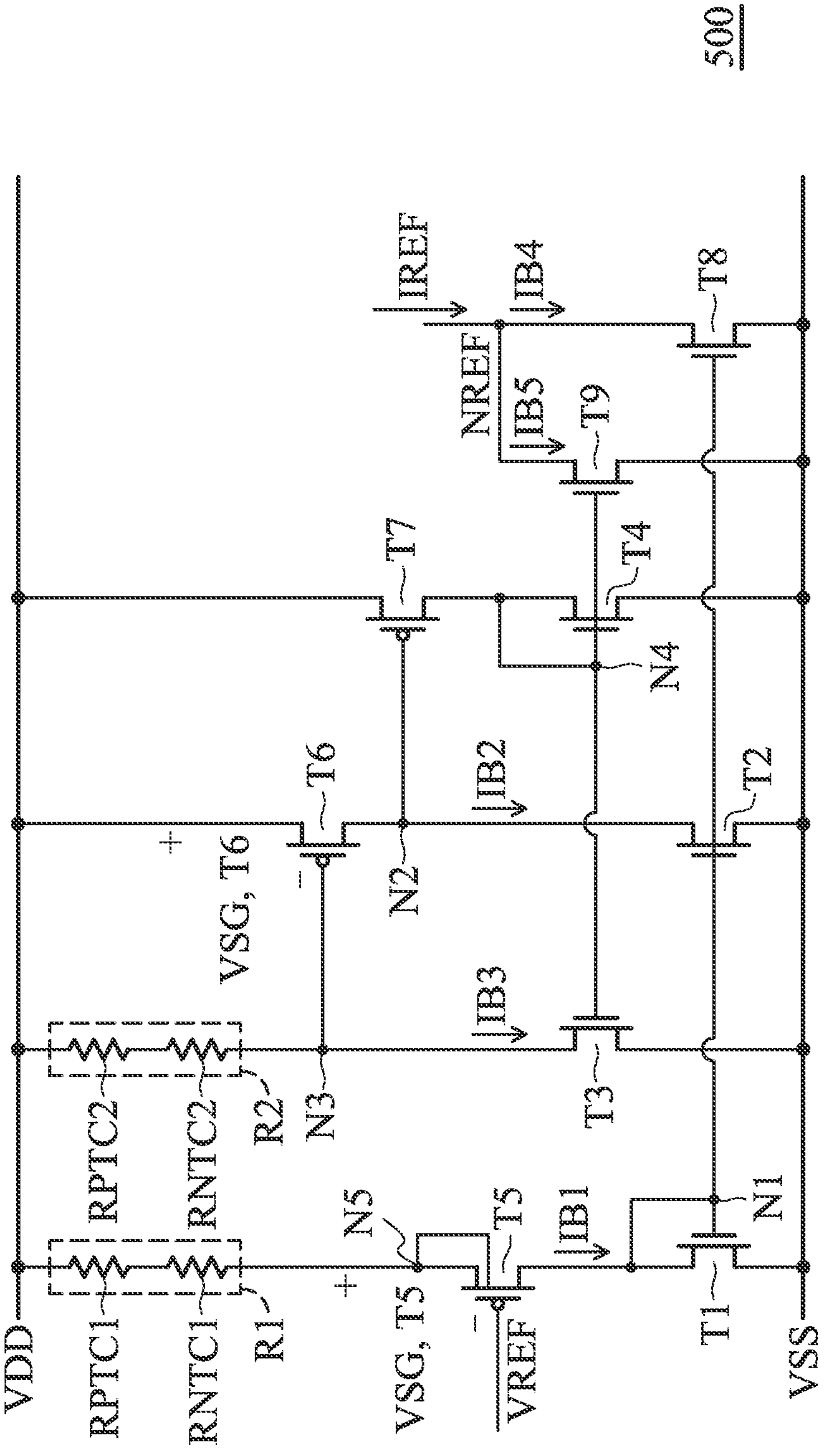
FIG. 5 is a circuit diagram of an electronic circuit in accordance with another embodiment of the invention.

FIG. 5 is a circuit diagram of an electronic circuit in accordance with another embodiment of the invention. Comparing the electronic circuit 500 of FIG. 5 with the electronic circuit 200 of FIG. 2, the electronic circuit 500 is similar to the electronic circuit 200, in which the first transistor T1, the second transistor T2, the third transistor T3, the fourth transistor T4, the eighth transistor T8 and the ninth transistor T9 of the electronic circuit 500 are all N-type transistors, and the fifth transistor T5, the sixth transistor T6, and the seventh transistor T7 of the electronic circuit 500 are all P-type transistors. In addition, the first resistor R1 of the electronic circuit 500 is coupled between the supply voltage VDD and the fifth node N5, and the second resistor R2 of the electronic circuit 500 is coupled between the supply voltage VDD and the third node N3.

According to an embodiment of the invention, when the fifth transistor T5 is turned on according to the reference voltage VREF, the fifth transistor T5 generates the first bias current IB1. The first bias current IB1 is expressed as Eq. 5, in which the fifth source-to-gate voltage VSG,T5 of the fifth transistor T5 is:

$$IB1 = \frac{VDD - VSG,\, T5 - VREF}{R1} \quad \text{(Eq. 5)}$$

According to an embodiment of the invention, when the length-to-width ratios of the first transistor T1 and the second transistor T2 are the same, the second bias current IB2 flowing through the sixth transistor T6 is equal to the first bias voltage current IB1. The second bias current IB2 flows through the sixth transistor T6 to generate a sixth source-to-gate voltage VSG,T6, and a third bias current IB3 is generated at the third node N3, in which the third bias current IB3 is expressed as Eq. 6:

$$IB3 = \frac{VSG,\, T6}{R2} \quad \text{(Eq. 6)}$$

According to an embodiment of the invention, when the first bias current IB1 is equal to the second bias current IB2 and the fourth bias current IB4 and the third bias current IB3 is equal to the fifth bias current IB5, the reference The reference current IREF generated by node NREF is expressed as Eq. 7:

$$IREF = IB4 + IB5 = \frac{VDD - VSG,\, T5 - VREF}{R1} + \frac{VSG,\, T6}{R2} \quad \text{(Eq. 7)}$$

According to an embodiment of the invention, when the length-to-width ratio sand the threshold voltages of the fifth transistor T5 and the sixth transistor T6 match to each other and the resistance value of the first resistor R1 and the resistance value of the second resistor R2 are both equal to the resistance value R, the reference current IREF may be simplified as Eq. 8:

$$IREF = \frac{VDD - VREF}{R} \quad \text{(Eq. 8)}$$

According to an embodiment of the invention, in order to make the fifth source-to-gate voltage VSG,T5 equal to the sixth source-to-gate voltage VSG,T6, the base terminal of the fifth transistor T5 is coupled to the fifth node N5, so that the fifth transistor T5 and the sixth transistor T6 have the same threshold voltage. In addition, in order to match the length-to-width ratios of the fifth transistor T5 and the sixth transistor T6 to each other, the placement of the fifth transistor T5 and the sixth transistor T6 needs to be carefully considered as well.

As shown in FIG. 5, the first resistor R1 includes a first positive temperature coefficient resistor RPTC1 and a first negative temperature coefficient resistor RNTC1, in which the ratio of the resistance value of the first positive temperature coefficient resistor RPTC1 to the resistance value of the first negative temperature coefficient resistor RNTC1 is the reciprocal of the ratio of the first positive temperature coefficient to the first negative temperature coefficient, so that the temperature coefficient of the first resistor R1 is reduced to zero. The second resistor R2 includes a second positive temperature coefficient resistor RPTC2 and a second negative temperature coefficient resistor RNTC2. The ratio of the resistance value of the second positive temperature coefficient resistor RPTC2 to the resistance value of the second negative temperature coefficient resistor RNTC2 is the reciprocal of the ratio of the second positive temperature coefficient to the second negative temperature coefficient, so that the temperature coefficient of the second resistor R2 is reduced to zero.

According to an embodiment of the invention, as shown in FIG. 5, through the negative feedback path formed by the third transistor T3, the fourth transistor T4, and the seventh transistor T7, the voltage of the node N3 and the third bias current IB3 can be effectively stabilized. The detailed operations are as described for the seventh transistor T7 in FIG. 2, which will not be repeated herein.

Figure 6:
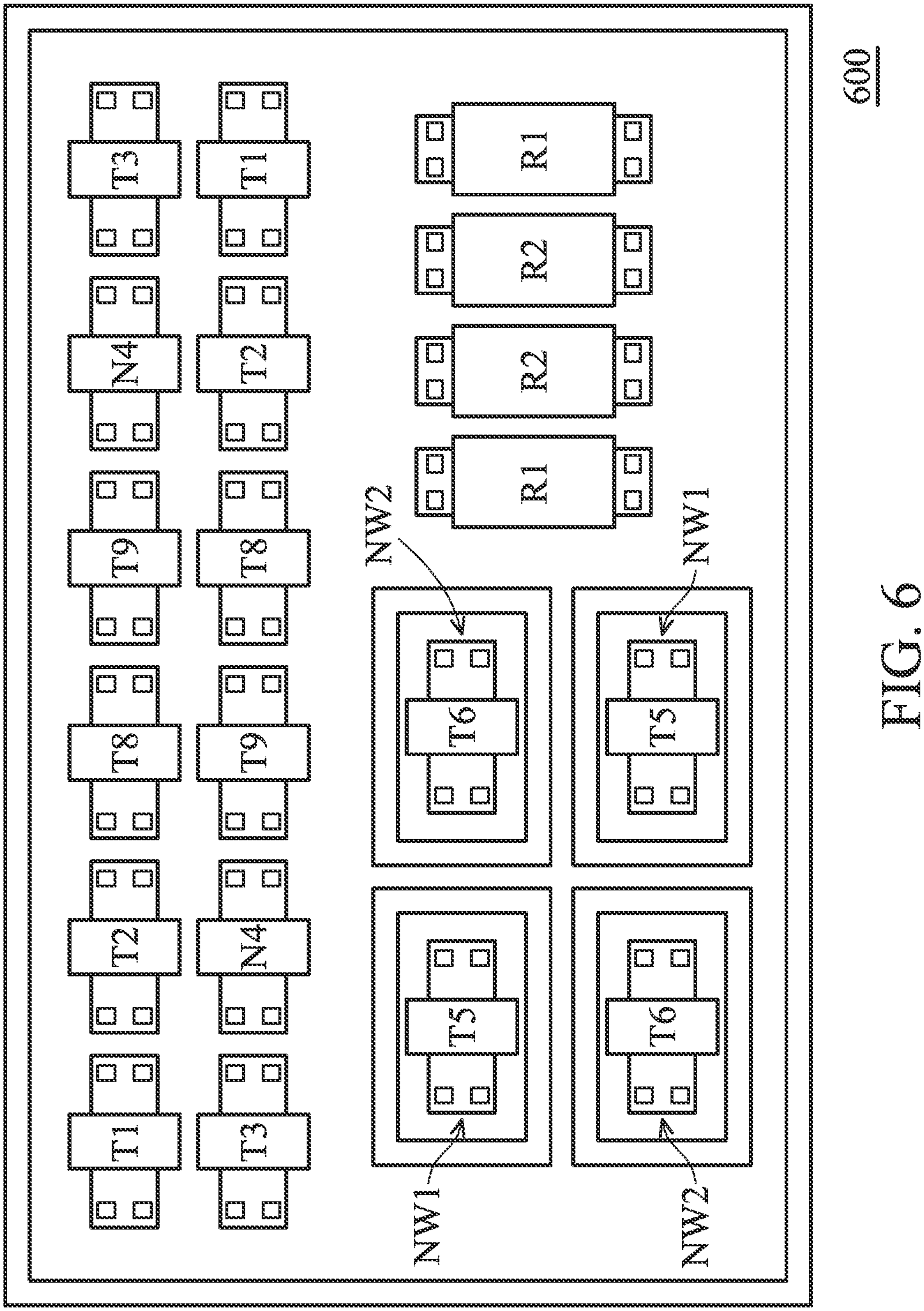
FIG. 6 is a top view showing the layout of the electronic circuit in FIG. 5 of the invention.

FIG. 6 is a top view showing the layout of the electronic circuit in FIG. 5 of the invention. The following description of the layout diagram 600 will be combined with the electronic circuit 500 in FIG. 5 for the convenience of detailed description.

According to some embodiments of the invention, since the first transistor T1, the second transistor T2, and the eighth transistor T8 form a current mirror, the first transistor T1, the second transistor T2, and the eighth transistor T8 must be matched to one another to maintain the ratio among the first bias current IB1, the second bias current IB2, and the fourth bias current IB4. In addition, the third transistor T3, the fourth transistor T4, and the ninth transistor T9 must be matched to one another to maintain the ratio between the third bias current IB3 and the fifth bias current IB5. Furthermore, the fifth transistor T5 and the sixth transistor T6 must be matched each other, and the ratio of the length-to-width ratio of the fifth transistor T5 to the length-to-width ratio of the sixth transistor T6 must be equal to the length-to-width ratio of the first transistor T1 to that of the second transistor T2.

As shown in FIG. 6, the first transistor T1, the second transistor T2, and the eighth transistor T8 are arranged in a common-centroid manner, the third transistor T3, the fourth transistor T4, and the ninth transistor T9 are also arranged in a common-centroid manner, so that in case of process variation, the ratio among the length-to-width ratios of the first transistor T1, the second transistor T2, and the eighth transistor T8 and the ratio among the length-to-width ratios among the third transistor T3, the fourth transistor T4, and the ninth transistor T9 can be kept constant.

As shown in the embodiment of FIG. 6, since the first transistor T1, the second transistor T2, the third transistor T3, the fourth transistor T4, the eighth transistor T8, and the ninth transistor T9 are illustrated to have the same length-to-width ratio herein, the first transistor T1, the second transistor T2, the third transistor T3, the fourth transistor T4, the eighth transistor T8, and the ninth transistor T9 are arranged together.

According to an embodiment of the invention, in order for the fifth source-to-gate voltage VSG,T5 of the fifth transistor T5 and the sixth source-to-gate voltage VSG,T6 of the sixth transistor T6 being cancelled out In Eq. 8 to reduce the temperature coefficient of the reference current IREF, the length-to-width ratios and the threshold voltages of the fifth transistor T5 and the sixth transistor T6 must be matched to each other. As shown in FIG. 5, the base terminal of the fifth transistor T5 is coupled to the fifth node N5 to eliminate the body effect of the fifth transistor T5. In addition, since the fifth transistor T5 is a P-type transistor, the fifth transistor T5 in FIG. 6 is formed in the first N-type well NW1.

In order to match the length-to-width ratios of the fifth transistor T5 and the sixth transistor T6, the sixth transistor T6 is also formed in the second N-type well NW2, and the first N-type well NW1 and the second N-type well NW2 are arranged in a common-centroid manner, so that the length-to-width ratios and the threshold voltages of the fifth transistor T5 and the sixth transistor T6 are still matched to each other under the condition of process variation. According to an embodiment of the invention, the first N-type well NW1 is coupled to the fifth node N5, and the second N-type well NW2 is coupled to the supply voltage VDD.

According to an embodiment of the invention, as shown in FIG. 6, the first resistor R1 and the second resistor R2 are arranged in a common-centroid manner, so that the resistance value of the first resistor R1 and the resistance value of the second resistor R2 remain essentially the same with process variation.

Figure 7:
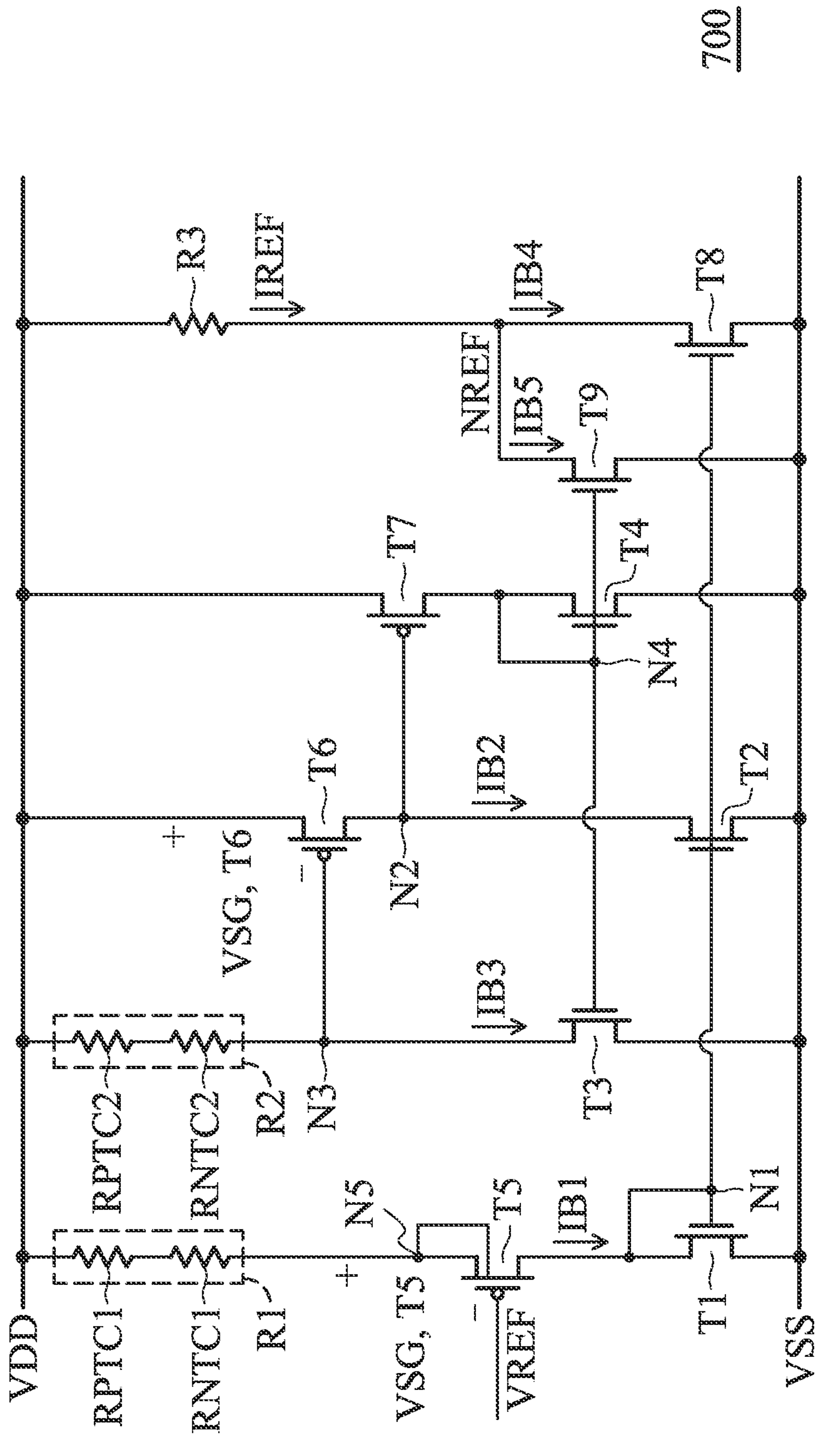
FIG. 7 is a circuit diagram of an electronic circuit in accordance with another embodiment of the invention.

FIG. 7 is a circuit diagram of an electronic circuit in accordance with another embodiment of the invention. As shown in FIG. 7, compared with the electronic circuit 500 in FIG. 5, the electronic circuit 700 further includes a third resistor R3, in which the third resistor R3 is coupled between the reference node NREF and the supply voltage VDD. According to other embodiments of the invention, the temperature coefficient of the third resistor R3 is reduced to zero by the way of connecting a resistor with the positive temperature coefficient and a resistor with the negative temperature coefficient in series as the first resistor R1 and the second resistor R2 do, which will not be repeated herein.

According to some embodiments of the invention, the electronic circuit 700 may generate the output voltage VOUT at the reference node NREF with a selection of the third resistor R3, in which the temperature coefficient of the output voltage VOUT is determined by the temperature coefficient of the reference voltage VREF, and the output voltage VOUT can be any voltage value not less than the source-to-drain voltage of the eighth transistor T8 or the ninth transistor T9 and less than the supply voltage VDD. In other words, under the condition that both the eighth transistor T8 and the ninth transistor T9 are stably operated in the saturation region, the output voltage VOUT can be any voltage between the supply voltage VDD and the ground terminal VSS.

The invention provides an electronic circuit for generating a reference current with high accuracy and a low temperature coefficient. Since the electronic circuit provided herein does not require an operational amplifier, the required circuit area and power consumption can be greatly reduced, and the electronic circuit provided herein can operate by itself without a current source. In addition, the electronic circuit provided herein makes the temperature coefficient of the reference current determined by the reference voltage through the matching of the transistors and the elimination of the temperature coefficient of the resistors. Furthermore, the electronic circuit provided herein may operate at a lower supply voltage, and may also convert the bandgap voltage to other voltage values by properly selecting the resistance values.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An electronic circuit, comprising:

a first transistor, comprising a first drain terminal, a first source terminal, and a first gate terminal, wherein the first drain terminal is coupled to a first node, the first source terminal is coupled to a supply voltage, and the first gate terminal is coupled to the first node;

a second transistor, comprising a second drain terminal, a second source terminal, and a second gate terminal, wherein the second drain terminal is coupled to a second node, the second source terminal is coupled to the supply voltage, and the second gate terminal is coupled to the first node;

a third transistor, comprising a third drain terminal, a third source terminal, and a third gate terminal, wherein the third drain terminal is coupled to a third node, the third source terminal is coupled to the supply voltage, and the third gate terminal is coupled to a fourth node;

a fourth transistor, comprising a fourth drain terminal, a fourth source terminal, and a fourth gate terminal, wherein the fourth drain terminal is coupled to the fourth node, the fourth source terminal is coupled to the supply voltage, and the fourth gate terminal is coupled to the fourth node;

a fifth transistor, comprising a fifth drain terminal, a fifth source terminal, and a fifth gate terminal, wherein the fifth drain terminal is coupled to the first node, the fifth source terminal is coupled to a fifth node, and the fifth gate terminal receives a reference voltage;

a sixth transistor, comprising a sixth drain terminal, a sixth source terminal, and a sixth gate terminal, wherein the sixth drain terminal is coupled to the second node, the sixth source terminal is coupled to a ground, and the sixth gate terminal is coupled to the third node;

a seventh transistor, comprising a seventh drain terminal, a seventh source terminal, and a seventh gate terminal, wherein the seventh drain terminal is coupled to the fourth node, the seventh source terminal is coupled to the ground, and the seventh gate terminal is coupled to the second node;

a first resistor, coupled between the fifth node and the ground; and a second resistor, coupled between the third node and the ground.

2. The electronic circuit as defined in claim 1, further comprising:

an eighth transistor, comprising an eighth drain terminal, an eighth source terminal, and an eighth gate terminal, wherein the eighth drain terminal is coupled to a reference node, the eighth source terminal is coupled to the supply voltage, and the eighth gate terminal is coupled to the first node; and a ninth transistor, comprising a ninth drain terminal, a ninth source terminal, and a ninth gate terminal, wherein the ninth drain terminal is coupled to the reference node, the ninth source terminal is coupled to the supply voltage, and the ninth gate terminal is coupled to the fourth node.

3. The electronic circuit as defined in claim 2, wherein the first transistor, the second transistor, the third transistor, the fourth transistor, the eighth transistor, and the ninth transistor are P-type transistors, and the fifth transistor, the sixth transistor, and the seventh transistor are N-type transistors.

4. The electronic circuit as defined in claim 3, further comprising:

a third resistor, coupled between the reference node and the ground, wherein an output voltage is generated at the reference node, wherein a temperature coefficient of the output voltage is determined by the reference voltage.

5. The electronic circuit as defined in claim 2, wherein the eighth transistor and the ninth transistor generate a reference current at the reference node, wherein a temperature coefficient of the reference current is determined by a temperature coefficient of the reference voltage, wherein the first transistor, the second transistor, and the eighth transistor are arranged in a common-centroid manner, and the third transistor, the fourth transistor, and the ninth transistor are arranged in the common-centroid manner.

6. The electronic circuit as defined in claim 1, wherein a base terminal of the fifth transistor is coupled to the fifth node, and a base terminal of the sixth transistor is coupled to the ground, wherein the fifth transistor is deposited in a first P-type well coupled to the fifth node, and the sixth transistor is deposited in a second P-type well coupled to the ground, wherein the first P-type well and the second P-type well are arranged in a common-centroid manner.

7. The electronic circuit as defined in claim 1, wherein the first resistor comprises:

a first sub-resistor, having a first positive temperature coefficient; and a second sub-resistor, having a first negative temperature coefficient, wherein the first sub-resistor and the second sub-resistor are connected in series to form the first resistor.

8. The electronic circuit as defined in claim 7, wherein a ratio of a resistance value of the first sub-resistor to a resistance value of the second sub-resistor is a first resistance ratio, and a ratio of the first positive temperature coefficient to the first negative temperature coefficient is a first temperature-coefficient ratio, wherein the first resistance ratio is a reciprocal of the first temperature-coefficient ratio for reducing a temperature coefficient of the first resistor.

9. The electronic circuit as defined in claim 7, wherein the second resistor comprises:

a third sub-resistor, having a second positive temperature coefficient; and a fourth sub-resistor, having a second negative temperature coefficient, wherein the third sub-resistor and the fourth sub-resistor are connected in series to form the second resistor.

10. The electronic circuit as defined in claim 9, wherein a ratio of a resistance value of the third sub-resistor to a resistance value of the fourth sub-resistor is a second resistance ratio, and a ratio of the second positive temperature coefficient to the second negative temperature coefficient is a second temperature-coefficient ratio, wherein the second resistance ratio is a reciprocal of the second temperature-coefficient ratio for reducing a temperature coefficient of the second resistor.

11. An electronic circuit, comprising:

a first transistor, comprising a first drain terminal, a first source terminal, and a first gate terminal, wherein the first drain terminal is coupled to a first node, the first source terminal is coupled to a ground, and the first gate terminal is coupled to the first node;

a second transistor, comprising a second drain terminal, a second source terminal, and a second gate terminal, wherein the second drain terminal is coupled to a second node, the second source terminal is coupled to the ground, and the second gate terminal is coupled to the first node;

a third transistor, comprising a third drain terminal, a third source terminal, and a third gate terminal, wherein the third drain terminal is coupled to a third node, the third source terminal is coupled to the ground, and the third gate terminal is coupled to a fourth node;

a fourth transistor, comprising a fourth drain terminal, a fourth source terminal, and a fourth gate terminal, wherein the fourth drain terminal is coupled to the fourth node, the fourth source terminal is coupled to the ground, and the fourth gate terminal is coupled to the fourth node;

a fifth transistor, comprising a fifth drain terminal, a fifth source terminal, and a fifth gate terminal, wherein the fifth drain terminal is coupled to the first node, the fifth source terminal is coupled to a fifth node, and the fifth gate terminal receives a reference voltage;

a sixth transistor, comprising a sixth drain terminal, a sixth source terminal, and a sixth gate terminal, wherein the sixth drain terminal is coupled to the second node, the sixth source terminal is coupled to a supply voltage, and the sixth gate terminal is coupled to the third node;

a seventh transistor, comprising a seventh drain terminal, a seventh source terminal, and a seventh gate terminal, wherein the seventh drain terminal is coupled to the fourth node, the seventh source terminal is coupled to the supply voltage, and the seventh gate terminal is coupled to the second node;

a first resistor, coupled between the fifth node and the supply voltage; and a second resistor, coupled between the third node and the supply voltage.

12. The electronic circuit as defined in claim 11, further comprising:

an eighth transistor, comprising a-an eighth drain terminal, an eighth source terminal, and an eighth gate terminal, wherein the eighth drain terminal is coupled to a reference node, the eighth source terminal is coupled to the ground, and the eighth gate terminal is coupled to the first node; and a ninth transistor, comprising a ninth drain terminal, a ninth source terminal, and a ninth gate terminal, wherein the ninth drain terminal is coupled to the reference node, the ninth source terminal is coupled to the ground, and the ninth gate terminal is coupled to the fourth node.

13. The electronic circuit as defined in claim 12, wherein the first transistor, the second transistor, the third transistor, the fourth transistor, the eighth transistor, and the ninth transistor are N-type transistors, and the fifth transistor, the sixth transistor, and the seventh transistor are P-type transistors.

14. The electronic circuit as defined in claim 13, further comprising:

a third resistor, coupled between the reference node and the supply voltage, wherein an output voltage is generated at the reference node, wherein a temperature coefficient of the output voltage is determined by the reference voltage.

15. The electronic circuit as defined in claim 12, wherein the eighth transistor and the ninth transistor generate a reference current at the reference node, wherein a temperature coefficient of the reference current is determined by a temperature coefficient of the reference voltage, wherein the first transistor, the second transistor, and the eighth transistor are arranged in a common-centroid manner, and the third transistor, the fourth transistor, and the ninth transistor are arranged in the common-centroid manner.

16. The electronic circuit as defined in claim 11, wherein a base terminal of the fifth transistor is coupled to the fifth node, and a base terminal of the sixth transistor is coupled to the supply voltage, wherein the fifth transistor is deposited in a first N-type well coupled to the fifth node, and the sixth transistor is deposited in a second N-type well coupled to the supply voltage, wherein the first N-type well and the second N-type well are arranged in a common-centroid manner.

17. The electronic circuit as defined in claim 11, wherein the first resistor comprises:

a first sub-resistor, having a first positive temperature coefficient; and a second sub-resistor, having a first negative temperature coefficient, wherein the first sub-resistor and the second sub-resistor are connected in series to form the first resistor.

18. The electronic circuit as defined in claim 17, wherein a ratio of a resistance value of the first sub-resistor to a resistance value of the second sub-resistor is a first resistance ratio, and a ratio of the first positive temperature coefficient to the first negative temperature coefficient is a first temperature-coefficient ratio, wherein the first resistance ratio is a reciprocal of the first temperature-coefficient ratio for reducing a temperature coefficient of the first resistor.

19. The electronic circuit as defined in claim 17, wherein the second resistor comprises:

a third sub-resistor, having a second positive temperature coefficient; and a fourth sub-resistor, having a second negative temperature coefficient, wherein the third sub-resistor and the fourth sub-resistor are connected in series to form the second resistor.

20. The electronic circuit as defined in claim 19, wherein a ratio of a resistance value of the third sub-resistor to a resistance value of the fourth sub-resistor is a second resistance ratio, and a ratio of the second positive temperature coefficient to the second negative temperature coefficient is a second temperature-coefficient ratio, wherein the second resistance ratio is a reciprocal of the second temperature-coefficient ratio for reducing a temperature coefficient of the second resistor.

* * * * *